(12) United States Patent
Miller

(10) Patent No.: US 8,346,665 B2
(45) Date of Patent: Jan. 1, 2013

(54) DUAL-ACTIVATION FINANCIAL PRODUCTS

(75) Inventor: Paul Colin Miller, Glencoe, IL (US)

(73) Assignee: Enservio, Inc., Natick, MA (US)

( * ) Notice: Subject to any disclaimer, the term of this patent is extended or adjusted under 35 U.S.C. 154(b) by 359 days.

(21) Appl. No.: 12/759,239

(22) Filed: Apr. 13, 2010

(65) Prior Publication Data

US 2011/0251957 A1 Oct. 13, 2011

(51) Int. Cl.
*G06Q 40/00* (2006.01)
(52) U.S. Cl. .............................. 705/44; 705/35; 705/38
(58) Field of Classification Search .................. 705/35, 705/38, 44
See application file for complete search history.

(56) References Cited

U.S. PATENT DOCUMENTS

| | | | |
|---|---|---|---|
| 4,491,725 A | 1/1985 | Pritchard |
| 4,831,526 A | 5/1989 | Luchs et al. |
| 5,025,138 A | 6/1991 | Cuervo |
| 5,689,100 A | 11/1997 | Carrithers et al. |
| 5,950,169 A | 9/1999 | Borghesi et al. |
| 6,647,373 B1 | 11/2003 | Carlton-Foss |
| 6,707,581 B1 | 3/2004 | Browning |
| 7,174,302 B2 | 2/2007 | Patricelli et al. |
| 7,197,468 B1 | 3/2007 | Patricelli et al. |
| 7,203,654 B2 | 4/2007 | Menendez |
| 7,295,989 B2 | 11/2007 | Rudnick |
| 7,334,724 B2 | 2/2008 | Pallares |
| 7,380,707 B1 | 6/2008 | Fredman |
| 7,392,224 B1 | 6/2008 | Bauer et al. |
| 7,418,400 B1 | 8/2008 | Lorenz |
| 7,464,859 B1 | 12/2008 | Hawkins |
| 7,493,266 B2 | 2/2009 | Gupta |
| 7,536,349 B1 | 5/2009 | Mik et al. |
| 7,617,114 B1 | 11/2009 | Tooke, III et al. |
| 2001/0015101 A1 | 8/2001 | Iwaki et al. |
| 2002/0035529 A1 | 3/2002 | Tooke |
| 2002/0077867 A1 | 6/2002 | Gittins et al. |
| 2003/0078816 A1 | 4/2003 | Filep |
| 2003/0105722 A1 | 6/2003 | Welt |
| 2003/0139948 A1 | 7/2003 | Strech |
| 2003/0233260 A1 | 12/2003 | Snell et al. |
| 2004/0030587 A1 | 2/2004 | Danico et al. |
| 2004/0073507 A1 | 4/2004 | Scott et al. |
| 2004/0103007 A1 | 5/2004 | Wahlbin et al. |
| 2004/0148200 A1 | 7/2004 | Hodges |
| 2005/0043967 A1 | 2/2005 | Robinson et al. |
| 2005/0075912 A1 | 4/2005 | Bealke et al. |
| 2005/0131799 A1 | 6/2005 | Clay et al. |
| 2005/0192833 A1 | 9/2005 | Artinger |
| 2005/0228756 A1 | 10/2005 | Bealke et al. |
| 2006/0085231 A1 | 4/2006 | Brofman |
| 2006/0106650 A1 | 5/2006 | Bush |
| 2006/0218018 A1 | 9/2006 | Schmitt |

(Continued)

FOREIGN PATENT DOCUMENTS

JP 2003016308 1/2003

(Continued)

*Primary Examiner* — Lindsay M Maguire
*Assistant Examiner* — Hao Fu
(74) *Attorney, Agent, or Firm* — Bingham McCutchen LLP

(57) ABSTRACT

A system operating in conjunction with a financial account permits joint activation of a card associated with the financial account. An event-detection module detects an event related to the card and an authorization component for permitting certain individuals to use the card. A messaging module generates account-related messages and transmitting these messages to individuals associated with the financial account.

15 Claims, 2 Drawing Sheets

U.S. PATENT DOCUMENTS

| | | |
|---|---|---|
| 2006/0253351 A1 | 11/2006 | Keaney |
| 2007/0100669 A1 | 5/2007 | Wargin et al. |
| 2007/0136104 A1 | 6/2007 | Bowen et al. |
| 2007/0139966 A1 | 6/2007 | Kim et al. |
| 2007/0150319 A1 | 6/2007 | Menendez |
| 2007/0156463 A1 | 7/2007 | Burton et al. |
| 2007/0182760 A1 | 8/2007 | Altounian et al. |
| 2007/0226018 A1 | 9/2007 | Gross et al. |
| 2007/0282740 A1* | 12/2007 | Wendt .................... 705/39 |
| 2008/0077449 A1 | 3/2008 | Klippel et al. |
| 2008/0103838 A1 | 5/2008 | Taylor et al. |
| 2008/0189141 A1 | 8/2008 | Gore |
| 2008/0228641 A1 | 9/2008 | Fredman |
| 2009/0006185 A1 | 1/2009 | Stinson |
| 2009/0037333 A1* | 2/2009 | Flitcroft et al. .......... 705/44 |
| 2010/0030585 A1 | 2/2010 | Fini |
| 2010/0049552 A1 | 2/2010 | Fini et al. |
| 2010/0125464 A1 | 5/2010 | Gross et al. |
| 2010/0145734 A1 | 6/2010 | Becerra et al. |
| 2010/0235198 A1 | 9/2010 | Fini et al. |

FOREIGN PATENT DOCUMENTS

| | | |
|---|---|---|
| JP | 2003108762 A | 4/2003 |
| JP | 2006228172 | 8/2006 |
| KR | 10-0792175 | 1/2008 |
| MX | 2008011027 A | 3/2009 |
| WO | WO-0066367 | 11/2000 |
| WO | WO-0104821 | 1/2001 |
| WO | WO-2006060286 A2 | 6/2006 |
| WO | WO-2006078793 A2 | 7/2006 |
| WO | WO-2007139966 A2 | 12/2007 |
| WO | WO-2008115429 A1 | 9/2008 |
| WO | WO-2009/108325 | 3/2009 |
| WO | WO-2009/114199 | 9/2009 |
| WO | WO-2010/104586 | 9/2010 |

* cited by examiner

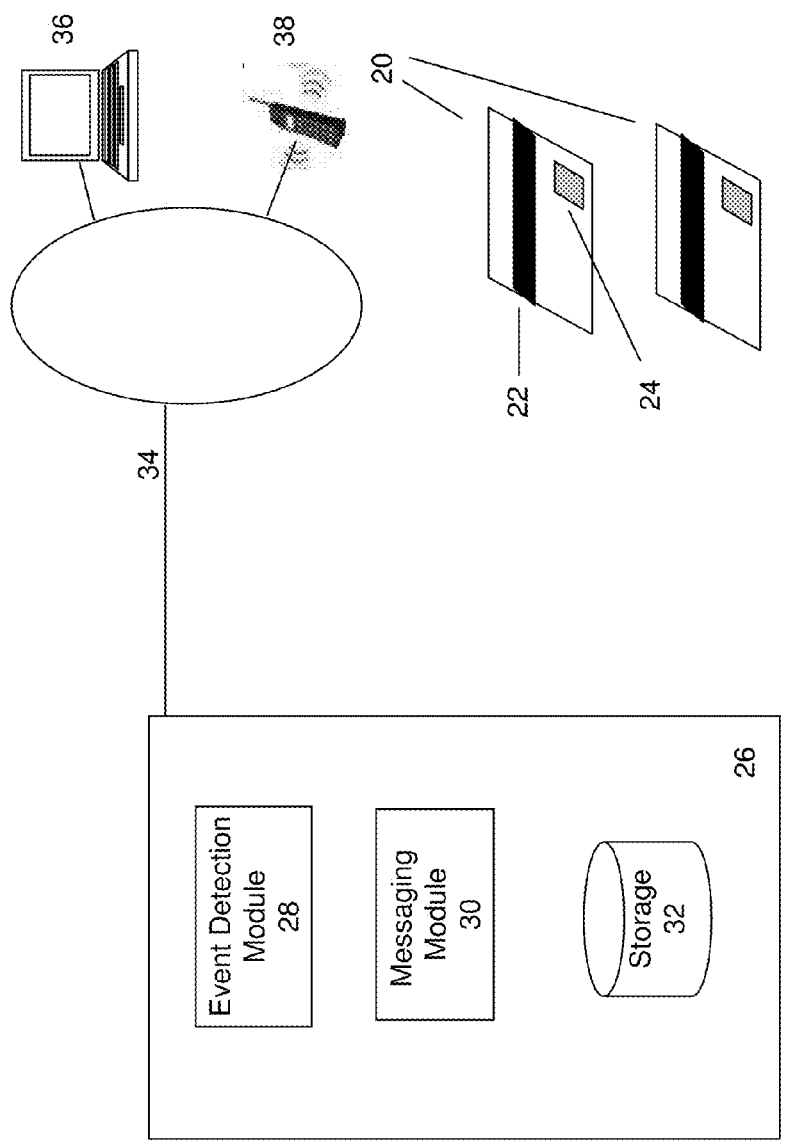

DUAL-ACTIVATION FINANCIAL PRODUCTS

TECHNICAL FIELD

Embodiments of the invention relate generally to systems and methods for reimbursing insured individuals for losses, and, more particularly, to systems, methods, and financial-services products that permit multiple individuals to use stored-value cards to purchase replacement items.

BACKGROUND OF THE INVENTION

Consumers and businesses often purchase insurance to cover losses to personal property. In many cases, insurance related to a home or business may cover more than just the physical structure. For example, a typical homeowner's policy covers losses of items within the home, such as furniture, clothing, electronics, appliances, artwork, jewelry, and other items. Renter's insurance covers many of the same items, excluding fixtures and the like.

When a loss occurs, conventional practice is to have the insurance company (the "issuer") assess the damage, estimate the loss, and provide a live check to the insured. In cases in which the property is held jointly (e.g., a husband and wife), the check is made payable to both individuals. While the issuer of the policy may control the amount of the check, it cannot determine how the insured will actually use the money. Moreover, issuing live checks is expensive, and prone to loss and fraud.

The retail and financial services industries have, over the past few years, actively embraced the "stored-value card" or "debit card" concept. These cards provide the holder with a pre-defined spending limit based on either a bank-account balance or a set amount associated with the card. The cardholder may use the card at participating retail establishments to purchase goods and services until the funds associated with the card are exhausted. Like credit cards, debit cards and some stored-value cards require authorization or activation by an individual cardholder prior to an initial use, and, in some cases, the use of a personal identification number ("PIN") to use the card.

What is needed is a system and associated techniques and products that allow insurance companies to issue stored-value cards which may be used to purchase replacement items (or any other items needed) based on losses actually incurred by the insured. Further, because the insured is often a company or multiple individuals, such cards may require joint activation and, as such permit use by more than one person.

BRIEF SUMMARY OF THE INVENTION

In one aspect of the invention, a system that operates in conjunction with a financial account is provided for permitting joint activation of a card associated with the financial account. The system includes an event-detection module for detecting an event related to the card and an authorization component for permitting certain individuals to use the card. The system further includes a messaging module for generating account-related messages and transmitting these messages to individuals associated with the financial account.

In some instances, the financial account is established in response an insurance claim. The financial account may represent an amount of money available to the owners of the insurance policy on which the claim was filed. In some cases, rules may be associated with the financial account that dictate, for example, categories of goods and/or services on which the money in the account may be spent, who may spend it, a date by which the money must be spent, and/or establishments where the money may be spent. The system may also include one or more data storage devices for storing card-activation information, cardholder information, and/or the rules governing usage of the cards.

In another aspect of the invention, a device associated with a financial account is provided. The device may include a data storage medium for storing computer-readable program code governing the authorization and use of the device. In some instances, the device is a stored-value card, a debit card or a credit card. In other cases, the device is a virtual device, such as an on-line credit, gift certificate, or balance made available to its users. The program code may include instructions for authorizing use of the card by multiple individuals associated with the financial account and, in some cases, require activation of the card by each of the multiple individuals prior to its use. The program code may include instructions for implementing rules governing use of the device, such as restrictions on goods or services to which the money in the account may be applied, who may spend it, a date by which the money must be spent, and/or establishments where the money is spent.

In yet another aspect, a computer-implemented method is provided for authorizing and governing the use of a debit card, stored-value card, credit card, or similar device. Alternatively, the device may be a virtual device, such as an on-line credit, gift certificate, or balance made available to its users. The computer-implemented method comprises initiating a financial account based on an insurance claim and issuing cards to the insured parties. A first insured party activates the card, and messages are sent to subsequent parties to request activation. Once all required parties have activated the card(s), the card(s) may be used to purchase goods and services. In some case, restrictions are imposed on usage of the cards.

BRIEF DESCRIPTION OF THE DRAWINGS

The present invention is described in detail below with reference to the attached drawing, wherein:

FIG. 2 is a block diagram illustrating the components of a multi-user activation card system in accordance with an embodiment of the invention.

DETAILED DESCRIPTION OF PREFERRED EMBODIMENTS

Figure 1:
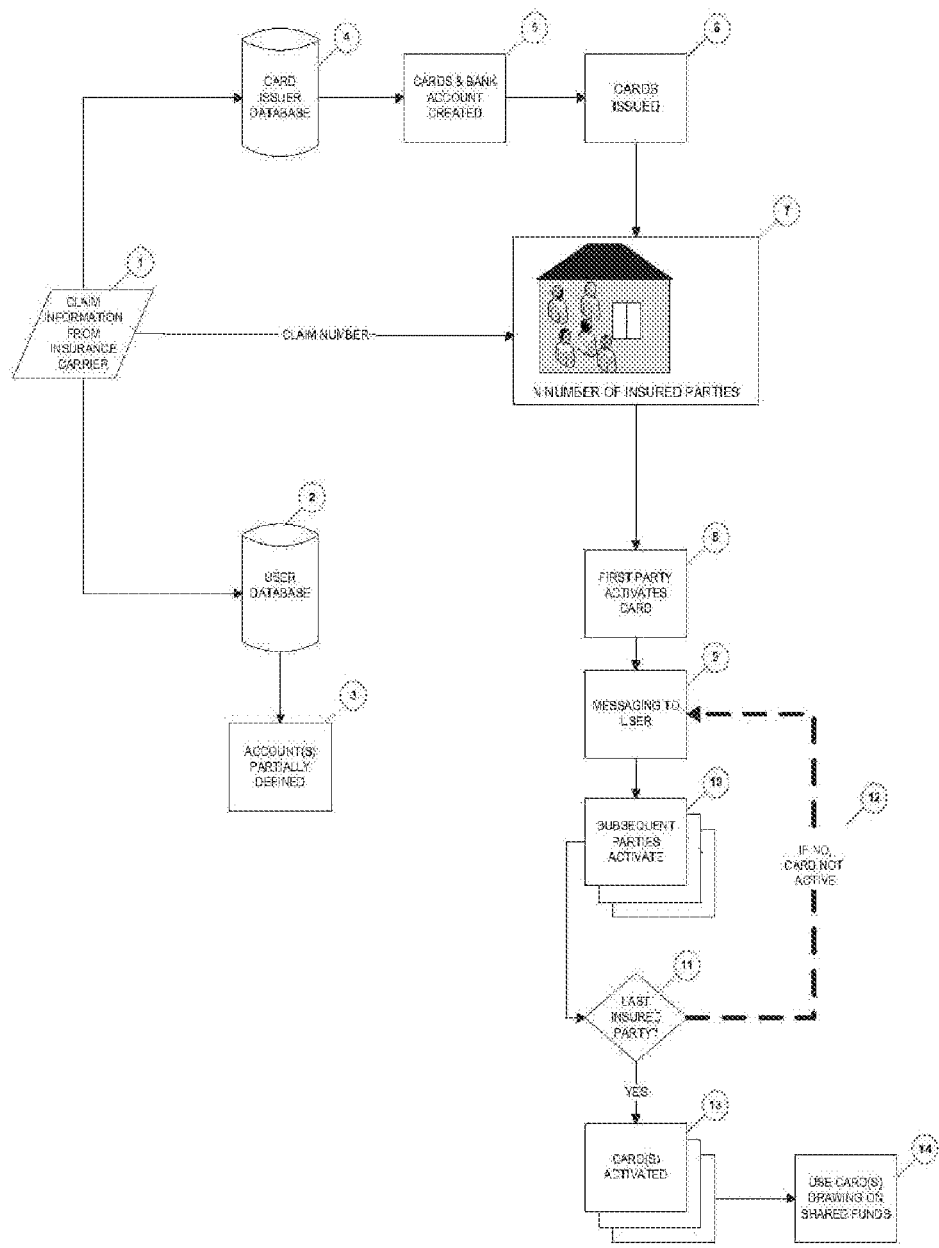
FIG. 1 is a flow chart illustrating the operation of a multi-user activation card system in accordance with an embodiment of the invention.

When a consumer or business suffers a loss of property due to fire, theft or other event, an insurance claim may be filed to cover the replacement cost associated with the loss. Often, the claim arises from an insurance policy owned either by an entity (e.g., a corporation) or a couple (e.g., a husband and wife). In either case, common practice is to issue a live check in the amount deemed appropriate given the loss. For example, if a fire consumes clothing, appliances and household items in a couple's home, the couple can file a claim against their homeowners policy requesting reimbursement for the lost items. Once an amount is agreed upon, the insurer issues a check, typically made payable to the couple jointly.

FIG. 1 illustrates one aspect of the present invention in which a stored-value card is used as the method of payment and requires activation, i.e., an authentication and identification procedure performed by the cardholders in order to authorize its use. As used herein a "card" may refer to a debit card, a credit card, a gift card, an online stored-value account, or other device (either physical or virtual) that is associated with a financial account. In some instances, as described above, activation may be required from both a husband and a wife, whereas in other instances (e.g., where the insured is a business) activation may be required from more than one officer of the company. Specifically, an insurance claim is filed (Element 1). The claim is checked against a database (Element 2) to ensure that the claim is valid and to identify the persons to which the proceeds of the claim are to be paid. In some instances, additional information may be appended to the user information (Element 3) (e.g., bank account number, demographic information, loss items, etc.) to complete the claim. Once the claim is confirmed and complete, information about the policy holder(s), an amount, activation requirements, and any redemption restrictions are forwarded to a card-issuer database (Element 4) and stored therein.

To "fund" the card(s), the insurer transfers money to a bank, credit union, or an account at one or more retail entities in the name of the insured party, thus establishing a financial account for their use (Element 5). A card issuer (typically a bank) issues one or more cards (Element 6) linked to the account that may be used to access the funds in the account. Where the insured party comprises more than one person (e.g., a husband and wife) or is a company, a determination is made as to the number of cards needed (Element 7), and the card issuer and/or the insurer may, in such cases, require multiple activation events before the card(s) may be used. By requiring multiple parties to activate a card, the insurer and/or the financial institution issuing the card ensures that the card(s) are not being used by unauthorized individuals. In some cases, only one card may be issued, but multiple individuals (each having a different PIN or other unique password or identification token) may be required to activate the single card. In other cases, each individual may be issued a unique card, but none of the cards may be used until all of the cards (or, in some cases, some subset of the cards) are activated. For example, if a college student has a computer stolen from a dormitory and it is covered under her parents' homeowner's policy, a card may be issued to the parents and to the college student, but only require activation by each of the parents.

In each case in which multiple activation events are required, a first party activates the card (Element 8) either by calling an activation center, logging on to an activation website, swiping the card at an authorized ATM or other similar device, presenting himself personally at a retail establishment where the card may be used, or other procedure for enabling secure tranmission of account and/or personal information to the card issuer. In some cases, the activation information provided by the cardholder is confirmed by comparing it to data stored in the card-issuer database, the user database, or both. A message may then be sent to the person who first activated the card confirming her activation event. Messages may also be sent (Element 9) to the additional cardholders (of the same physical card or of different cards linked to the same account) requesting activation. In some cases, the messages may be sent asynchronously—i.e., each message is sent independently of the others and the order in which the messages are sent and acted upon is irrelevant. In other cases, subsequent parties activate the card(s) (Element 10) in turn, each receiving a message to activate his card after the previous person in the queue has activated. If the last cardholder has not activated the card (Decision Element 11 and Element 12), the process repeats, and a new message is sent to the next cardholder. If all the necessary cardholders have activated the card(s), the card(s) are activated (Element 13) and the cardholders can begin drawing funds from the associated account (Element 14).

FIG. 2 illustrates a system for implementing the techniques described above. A card or cards(s) 20 may have stored thereon computer-readable instructions and/or data governing activation and/or usage restrictions, by means, e.g., of a magnetic strip 22, an embedded chip or memory device 24, or both. The card 20 can be, for example, a debit card, a credit card, a transfer funds card, a smart card, a stored-value card, a gift card, an ATM card, a security card or an identification card. The card 20 may also include components for providing or processing either account, identity, payment, health, transactional, or other information and communicating with central processing units or computers operated by the providers of services, such as credit card institutions, banks, health care providers, universities, retailers, wholesalers or other providers of goods or services employers, or membership organizations. Card features may also enable the card to communicate with or be accessed by other devices, including those used by retailers (e.g., point-of-sale computers), and personal computers used in other business applications or at home (for example, a personal computer having a built-in or attached card reader).

A central computing device 26 processes activation and authentication transactions related to the use of the card 20, and includes an event-detection module 28, a messaging module 30 and in some instances one or more data storage devices 32. The data storage devices 32 and/or central computing device 26 may store financial information pertaining to the account related to the card 20 as well as instructions for activating and authorizing use of the card. The central computer device 26 may send and receive communications regarding card activation and usage over a network 34, such as the Internet or, in some cases, a private network. Cardholders may use one or more computing and/or communication devices (e.g., a computer 36 or a hand-held device 38) to send and receive activation and authorization information from the central computing device 26.

For example, the central computing device 26 receives messages and/or events from cardholders wishing to activate and use the card 20 to purchase goods and services. However, in some implementations, the card 20 may require more than one activation event, and in such cases the event-detection module 28 identifies an activation request from a cardholder and processes computing instructions that solicit the additional necessary activations—e.g., initiatiating one or more messages to be formatted and sent to additional cardholders for subsequent activation.

In some instances, the location and/or identity of the cardholder and the communication device used to activate the card may be stored in the data storage device 32 to provide further authentication credentials. For example, a cardholder may be required to activate a card from a particular device such that the MAC ID, IP address or telephone number sent with the activation information to the central computing device 26 matches data stored in the data storage device 32.

In addition to multi-party activation requirements, the card (or cards) may also be subject to various usage rules. In some cases, the usage rules may be guidelines or incentives (e.g., using the card at a particular retailer allows the cardholder to receive special discounts and other offers) whereas in other cases the rules may dictate that the cardholders use the cards at specific locations (either physical or web-based) and/or for specific items. This may be the case where, for example, the card is issued based on an insurance claim against particular property such as electronics and clothing lost in a house fire. In such instances, the card issuer or other third party may operate a retail portal that allows cardholders to shop for replacement items directly, or in some cases via referrals to other participating retailers.

Further, the insurance company or financial institution may attribute usage rules to the card (and, by extension, the funds in the account associated with the card) that limit what the cardholders can purchase, where they can purchase goods from, price restrictions on certain goods, and/or by when the purchases must be made. For example, "sub-accounts" may be established within the financial account and linked to the card. The funds in these sub-accounts may be earmarked for particular expenses and, in some cases, may be periodically replenished based on the coverage provided by the insurer, or other agreements between the insurer and the insured. Funds in the sub-accounts may be used to pay for certain qualifying expenses such as per diem food and lodging expenses, and, so long as the charges are at approved establishments and/or fall within specified limits, may not require authorization or appoval. These rules are stored in the data storage device 32 and implemented each time the card is used. For example, the device 26 may implement a rules engine capable of implementing a suite of usage rules, only some of which will be applicable to a particular cardholder. Each cardholder's database record may contain pointers to the rules associated with that cardholder, along with arguments or values (particular types of items, allowed retailers, spending limits, etc.) for the parameters called for in the rules. These may be modified centrally as appropriate, and the specified rules in their current form, with the current parameter values, are invoked for each cardholder whenever he uses the card.

For example, a couple who recently suffered a loss due to a fire in their home may need to purchase new furniture, new clothing, new appliances, new electronics, and other household goods to replace those lost or damaged in the fire. Using the technique and system described above, both the husband and wife may be sent a card, each being linked to a financial account funded by their insurance company. The insurance company may instruct the card issuer that both the husband and wife need to independently activate their card so the both cards will be authorized for use.

In some implementations, the merchandise available to the cardholder may be pre-specified by the insurer funding the financial account to which the card is related. Such a restriction may be used to ensure that the cardholders use the funds from their claim to purchase actual replacement items, and, in some cases, may allow the insurance company to collect a referral fee from the retailer for channeling customers to their establishment. In certain instances, the merchandise available to a particular cardholder may be limited only to the exact items (or approved alternatives) claimed as lost pursuant to their policy. All of these restrictions may be implemented in rules, as described above.

The insurer may work with one or more online retailers (e.g., Amazon.com) and/or brick-and-mortar retailers with an extensive online presence (e.g., Sears, Target, etc.) to build cardholder-specific portals at which on the approved merchandise is available and, in some cases, use of the activated cards may be limited—by user-specific rules—to purchases from these portals. In other cases, the cards may be authorized for use at any retail establishment without any restrictions whatsoever.

The components of the central computing device 26 may be implemented by computer-executable instructions, such as program modules, being executed by a computer. Generally, program modules include routines, programs, objects, components, data structures, etc. that performs particular tasks or implement particular abstract data types. Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

The central computing device 26 may include a general-purpose computing device in the form of a computer including a processing unit, a system memory, and a system bus that couples various system components including the system memory to the processing unit. Computers typically include a variety of computer-readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system or another operating system of platform.

Any suitable programming language may be used in accordance with the various embodiments of the invention. Illustratively, the programming language used may include assembly language, Ada, APL, Basic, C, C++, C*, COBOL, dBase, Forth, FORTRAN, Java, Modula-2, Pascal, Prolog, Python, REXX, and/or JavaScript for example. Further, it is not necessary that a single type of instruction or programming language be utilized in conjunction with the operation of the system and method of the invention. Rather, any number of different programming languages may be utilized as is necessary or desirable.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

The network 34 may include a wired or wireless local area network (LAN) and a wide area network (WAN), wireless personal area network (PAN) and/or other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

While particular embodiments of the invention have been illustrated and described in detail herein, it should be understood that various changes and modifications might be made to the invention without departing from the scope and intent of the invention. From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

The invention claimed is:

1. A system, operating in conjunction with a financial account of an issuing institution having at least one card associated therewith for accessing funds in the financial account, the system requiring joint activation of usage of the at least one card by at least two cardholders associated therewith, the system comprising:
   a computational processing unit for data processing and execution of stored instructions; and
   associated with the processing unit, memory for storing computer-readable instructions executable by the processing-unit, the instructions, when executed by the processing unit, implementing
   (i) an event-detection module for detecting a first activation event, related to the at least one card, received from one of a plurality of cardholders associated with the financial account;
   (ii) a messaging module for transmitting, based on and in response to the detection of the first activation event, a request-for-activation message to the other cardholders associated with the financial account; and
   (iii) the event-detection module subsequently detecting, from each of the other cardholders associated with the financial account, a subsequent activation event;
   wherein the at least one card cannot be used by any of the cardholders until all of the cardholders have activated the at least one card in accordance with step (iii), and wherein the at least one card is authorized to be used by each cardholder once all of the cardholders have activated the at least one card.

2. The system of claim 1 wherein the messaging module transmits the requests for activation asynchronously according to a specified order.

3. The system of claim 1 wherein the messaging module transmits the requests for activation at substantially the same time.

4. The system of claim 1 further comprising a data storage component for storing activation and usage rules associated with the card.

5. The system of claim 4 wherein the usage rules limit use of the card to purchases of items within specified categories.

6. The system of claim 4 wherein the usage rules limit use of the card to purchases of specified items.

7. The system of claim 4 wherein the usage rules limit use of the card to purchases from specific retail establishments.

8. The system of claim 6 wherein the specified items comprise replacement items for items claimed on an insurance claim.

9. The system of claim 1 wherein the messages are transmitted using telephone communication or Internet communication.

10. A computer-implemented method for activating one or more charge cards associated with a single financial account of an issuing institution, the one or more charge cards requiring joint activation of usage by at least two cardholders associated therewith and facilitating access to funds within the financial account upon activation, the method comprising:
    executing, by a computational processing unit, computer-readable instructions, stored in a memory associated with the computational processing unit, for
    detecting a first activation event, related to the one or more cards, received from a first cardholder associated with the financial account;
    based on and in response to the first detected activation event, electronically and automatically transmitting a request to the other cardholders associated with the financial account to activate the card;
    subsequently to the detection of the first detection event, detecting activation events from each of the other cardholders associated with the financial account; and
    preventing use of the one or more charge cards until all of the cardholders associated with the financial account have activated the one or more charge cards and authorizing the one or more charge cards for use once all cardholders associated with the financial account have activated the one or more charge cards.

11. The computer-implemented method of claim 10 further comprising using the processing unit to execute instructions for limiting use of the card to purchases of pre-specified merchandise.

12. The computer-implemented method of claim 11 wherein the pre-specified merchandise corresponds to items claimed as lost in an insurance claim filed by the cardholders.

13. The computer-implemented method of claim 11 further comprising using the processing unit to execute instructions for limiting use of the card to purchases at pre-specified retail establishments.

14. The system of claim 1, wherein the at least one card comprises at least two cards.

15. The method of claim 10, wherein the one or more charge cards comprise at least two charge cards.

* * * * *